United States Patent Office 3,298,469
Patented Jan. 17, 1967

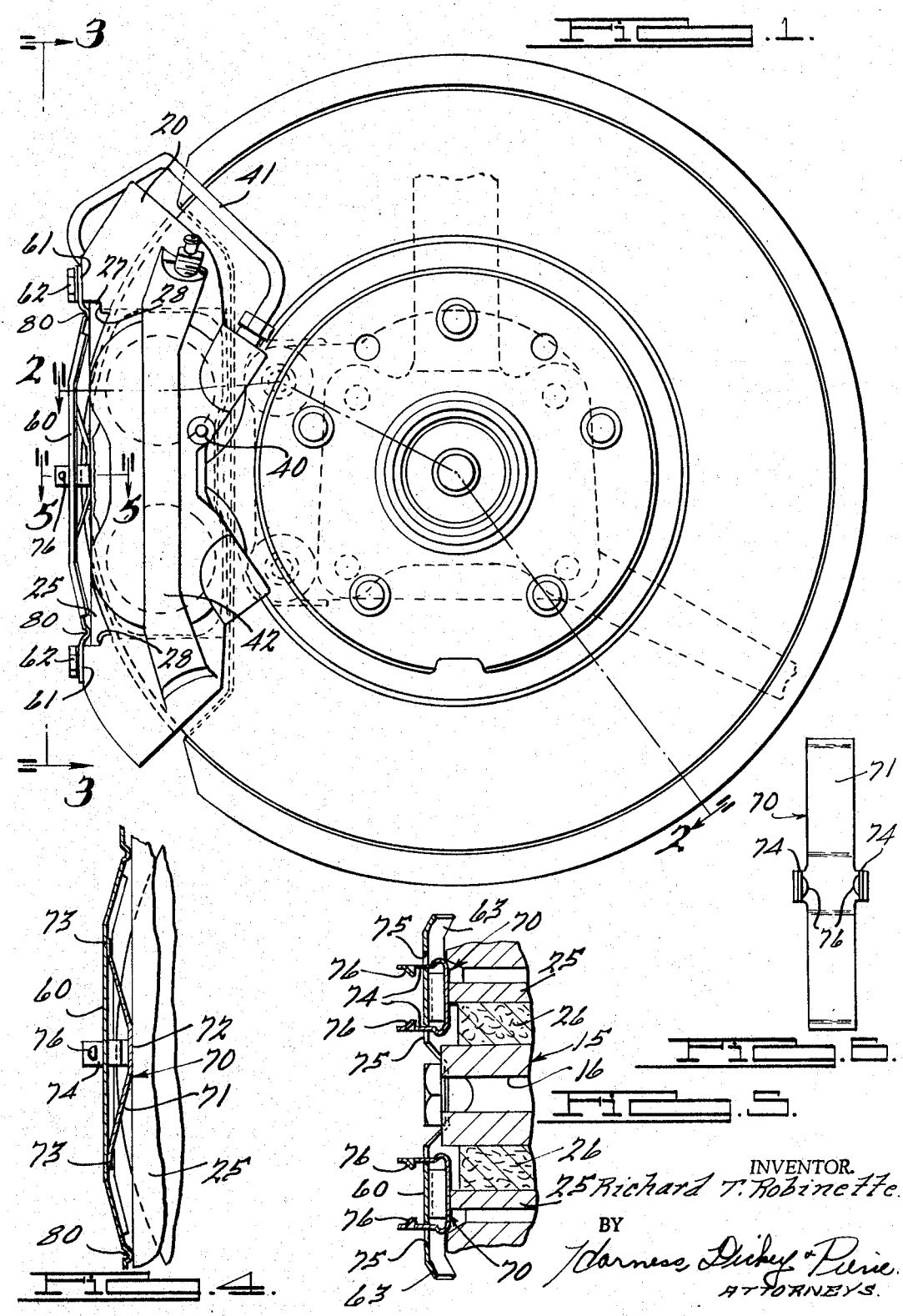

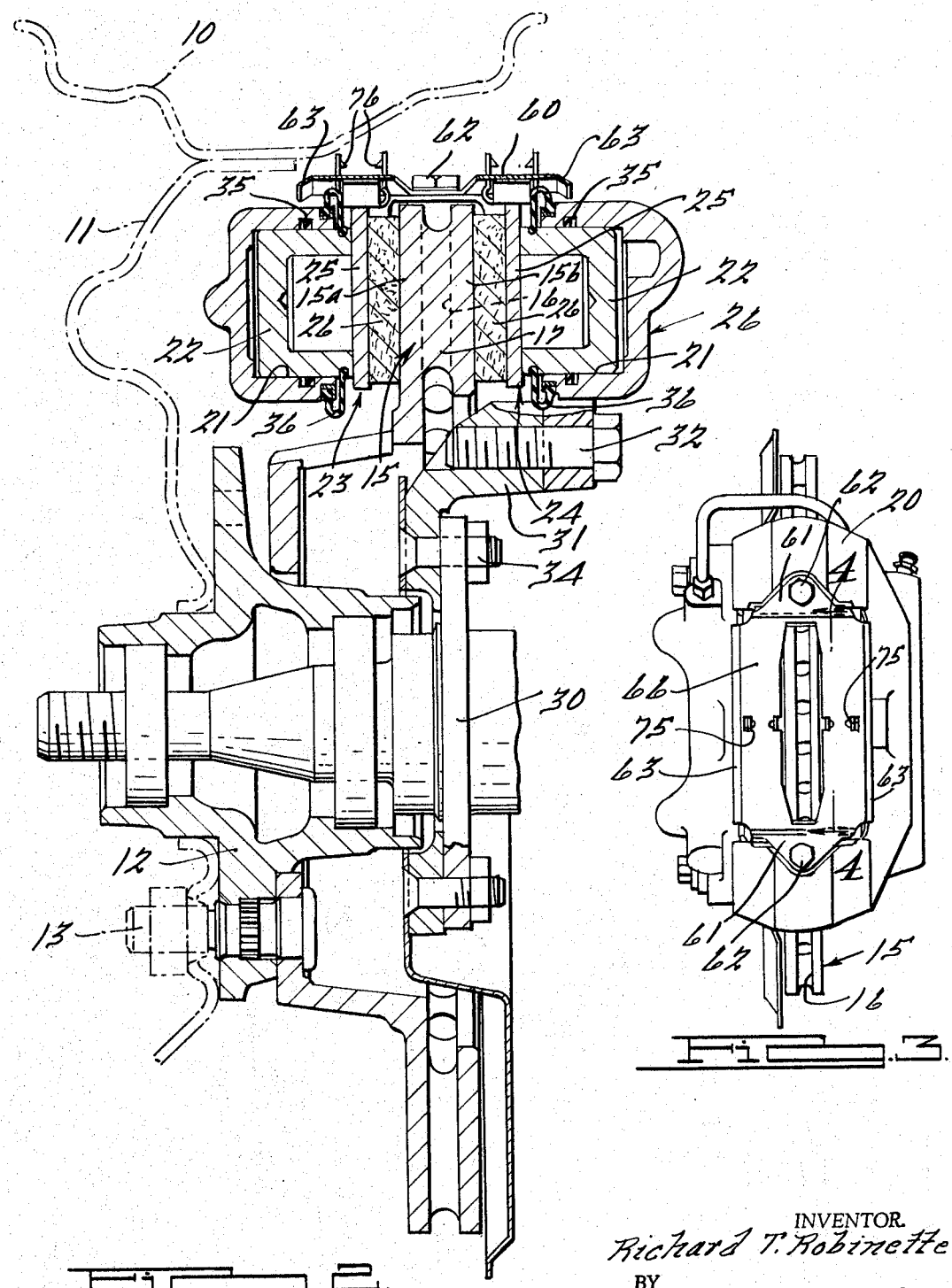

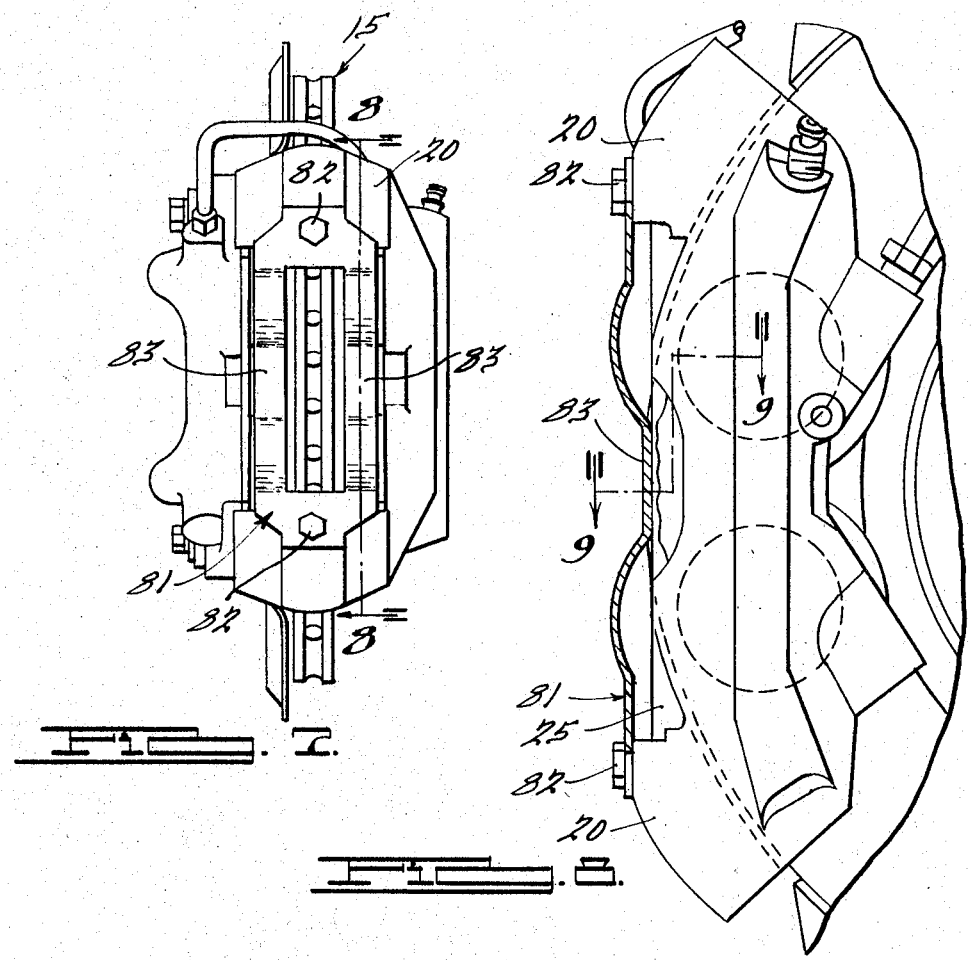
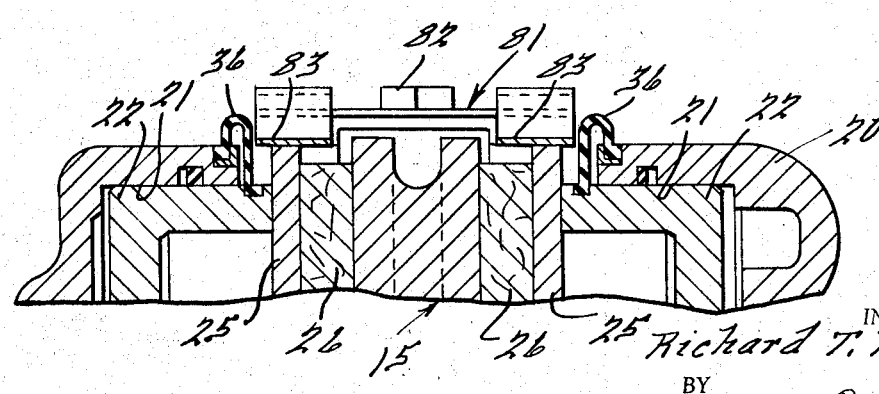

3,298,469
DISK BRAKE
Richard T. Robinette, St. Clair Shores, Mich., assignor to Kelsey-Hayes Company, Romulus, Mich., a corporation of Delaware
Filed Feb. 23, 1965, Ser. No. 434,397
1 Claim. (Cl. 188—73)

This invention relates to wheel brakes for vehicles and, more particularly, to improvements in disk brakes adapted to render the same more efficient and improve the same generally.

One of the important objects of this invention is to provide a combined splash shield and antirattling device which may be quickly and easily attached to a conventional disk brake.

In disk brakes, the peripheries of the brake shoes are frequently exposed at their top edges where they pass through the caliper or brake housing. Thus, mud, dirt and other foreign material may readily come into contact with the brake shoes and brake disk, particularly in the area where they engage the brake shoe actuating pistons. The presence of this foreign material in this area affects the efficient operation of the brakes. Also, the brake shoes are slidably mounted on the caliper and during movement of the vehicle tend to cause a rattling noise which is objectionable.

Therefore, the principal object of this invention is to provide a simple device comprising a splash shield which will protect the brake shoes against the accumulation of foreign matter combined with antirattling devices which will prevent any objectionable movement of the brake shoes which would cause the brake to become noisy.

These objects of the invention are attained by the provision of a preferably sheet metal splash plate or shield secured to the caliper in the area in which the brake shoes are located and the attachment thereto of spring plates or members which engage the peripheries of the backing plates of the brake shoes to hold the same against rattling movement.

The objects of this invention are accomplished by a construction which is so reduced in the number and character of its component parts as to approach the ultimate in structural simplicity to thereby create an economy in its manufacture, installation and maintenance costs.

The various objects and advantages, and the novel details of construction of one commercially practical embodiment of the invention, will become more apparent as this description proceeds, especially when considered in connection with the accompanying drawings, in which:

FIGURE 1 is an elevational view of a brake constructed in accordance with this invention;

FIGURE 2 is an enlarged sectional view taken substantially on the plane indicated by line 2—2 in FIGURE 1;

FIGURE 3 is an elevational view as viewed from line 3—3 in FIGURE 1;

FIGURE 4 is a detail fragmentary sectional view taken substantially on the plane indicated by line 4—4 in FIGURE 3;

FIGURE 5 is a sectional view taken substantially on the plane indicated by line 5—5 in FIGURE 1;

FIGURE 6 is a plan view of the resilient member;

FIGURE 7 is a view similar to a portion of FIGURE 1 showing a slightly modified form of construction;

FIGURE 8 is an enlarged fragmentary sectional elevational view similar to FIGURE 5 taken on line 8—8 of FIGURE 7 showing the modified combined splash shield and antirattling device in longitudinal section; and FIGURE 9 is a fragmentary sectional view taken substantially on the plane indicated by line 9—9 in FIGURE 8.

The brake of this invention is shown as being associated with a vehicle rim 10 and a wheel body 11, both shown in dot-and-dash lines in FIGURE 2. The wheel body 11 is secured to the axle flange 12 by means of studs or bolt and nut assemblies 13.

Also secured to the axle flange 12, as for instance by means of the same stud or bolt and nut assemblies 13 is a brake disk 15. In the form of the invention illustrated, the brake disk is formed with a pair of walls 15a and 15b. The brake is provided with a plurality of radially extending apertures or openings 16 and the webs 17 therebetween function as fan blades to move cooling air in a radially outward direction between the walls 15a and 15b when the brake is rotated. This serves to reduce the heat generated by the engagement of the brake shoes with the brake disk, as will be well understood.

Enclosing a part only of the braking surface of the brake disk 15 is a caliper-like member 20 in the form of a housing or yoke member which straddles the brake disk. As will be seen from FIGURE 2, the sides of the yoke member are spaced on opposite sides of the disk 15 and are shaped to provide opposed cylinders 21 in which the brake shoe actuating pistons 22 are disposed. These pistons engage brake shoes 23 and 24, each of which is provided with a backing plate 25 and a friction lining 26. Each backing plate 25 is formed with a pair of ears 27 which engage ledges 28 on the housing 20 to slidably support the brake shoes.

The housing 20 is nonrotatably mounted on a fixed part 30 of the axle structure by means of a torque member 31 to which the housing 20 is attached by means of bolts or the like 32. The torque member 31 is connected to the axle part 30 by means of bolts 34.

Each piston 22 is preferably provided with an annular seal 35 which may be and preferably is in the form of an annular ring square in cross section. This restricts free movement of the pistons 22 and also seals the periphery thereof. Also, each piston is provided with an annular boot 36 formed of rubber, canvas, or any other suitable flexible material to close the clearance between the pistons 22 and the cylinders 21 to exclude therefrom dust or other foreign material.

Fluid may be introduced into the cylinders behind the pistons 22 by means of a fluid pressure inlet 40. The reference character 41 indicates one or more conduits connecting the cylinders 21 on one side of the device with the cylinders on the opposite side so that fluid under pressure may simultaneously be admitted to both sets of cylinders. Also, the cylinders are connected by an interior conduit 42 to a bleed opening 43 whereby the system may be freed from trapped air.

While heretofore one particular form of disk brake has been illustrated and described, it will be immediately obvious that any desired or preferred type of brake construction may be employed which involves the use of a brake disk and brake shoes of the backing plate-lining type.

In disk brakes of this general type, the top edges of the brake shoes are exposed where they pass through the caliper-like member 20. Also, the adjacent periphery of the brake disk is exposed. This permits mud, dirt and other foreign material to collect on these parts. The presence of this foreign material in this area affects the efficient operation of the brakes. The present invention contemplates the provision of a splash shield to protect these parts. Also, due to the necessary manufacturing tolerances, the periphery of the brake disk moves laterally and its engagement with the adjacent parts causes a rattling noise which is objectionable. These deficiencies in disk type brakes are minimized or eliminated by the present invention.

Applicant's improvement consists of providing a preferably sheet metal plate 60 which is arched longitudinally and has its ends 61 secured to the caliper member 20 by means of bolts or the like 62. This plate member 60 constitutes a splash shield and it is secured to the yoke member 20 adjacent the outer peripheries of the brake shoes and thus covers or closes the space therebetween. The longitudinal edges of the splash shield 60 are preferably provided with downwardly inclined flanges 63 which assist in the exclusion of foreign material. The ends 61 of the plate 60 lie in substantially the same plane as the caliper member 20 so as to receive the fastening elements 62. The body portion of the splash plate 60 is spaced slightly above the brake shoes and the brake disk, but the plate is in sufficiently close proximity to these parts to exclude most of the foreign material therefrom.

The splash plate 60 is also employed to carry or support antirattling devices 70 which engage the backing plates 25 of the brake shoes to prevent excessive vibration or movement thereof which makes the brakes noisy. Each antirattling device consists of a substantially inverted U-shaped member 71 made preferably of spring metal, which has its intermediate or center portion 72 engaging the adjacent periphery of the backing plate 25. The opposite ends of the inverted U-shaped member 71 are provided with flanges 73 which slidably engage the underside of the splash plate 60.

For removably securing each antirattling device 70 to the splash plate 60, each antirattling device 70 is provided with a pair of spring arms 74 which engage apertures 75 in the splash plate. Each spring arm is provided with a laterally displaced detent 76 to prevent the accidental displacement of the antirattling devices 70.

With the arrangement illustrated, the antirattling devices 70 may be assembled with the splash plate before the latter is secured in place on the caliper member 20 by the fasteners 62.

When the splash plate 60 is secured in place by its fastening members 62, the antirattling devices 70 are pressed against the adjacent edges of the backing plates 25 and because these members 70 are in the form of inverted U-shaped members 71 of resilient material, the antirattling devices 70 are pressed against the peripheries of the backing plates 25 with sufficient pressure to prevent untoward movement thereof. Also, this structure permtis the antirattling devices 70 to be removed and replaced, should they become worn.

In addition to the downwardly inclined flanges 63, the splash plate 60 is provided with transverse ribs 80 which have a sealing engagement with the edge of the backing plate. This construction assists in the exclusion of foreign matter.

From the foregoing description, it will be apparent that the splash plate 60 covers the space between the brake shoes and the yoke member and that the antirattling devices or shoes 70 engage the backing plates of the brake shoes to prevent rattling movement of the latter. The construction of the device is such that it may be readily assembled and attached to a disk brake to accomplish the purposes set forth. All of the parts except the fasteners 62 are such that the parts may be made as stampings from sheet metal.

A modification of the invention is illustrated in FIGURES 7, 8 and 9. In this form of construction, the splash plate 81 is in the form of a substantially flat plate secured at its ends to the yoke member 20 by means of fastening elements 82. The splash plate 81 is preferably formed of resilient material such as thin metal. The splash plate is formed with laterally extending depressions providing projections 83 which engage the backing plates 25 of the brake shoes. The projections 83 are resilient, the same as the body of the splash plate, and thus resiliently engage the backing plates of the brake shoes to prevent excessive vibration or movement thereof which would cause the brake to be noisy. The projections 83 lightly press against the adjacent edges of the backing plates 25 when the splash plate 81 is secured in place so as to prevent excessive vibration or movement thereof, as described in connection with the first embodiment of this invention. Also, the splash plate 81 acts to exclude dirt and other foreign material from the brake shoes and brake disk, as in the previously described construction.

While two commercially practical embodiments of the invention have been described and illustrated herein somewhat in detail, it will be understood that various changes may be made as may come within the purview of the accompanying claim.

What is claimed is:

In a disk brake for vehicle wheels having, a brake disk rotatable with the wheel, a yoke member straddling a portion of the periphery of said brake disk, brake shoes mounted on said yoke member, each brake shoe comprising a backing plate, and brake actuating pistons carried by said yoke member adapted to actuate said brake shoes, that improvement which comprises, a splash plate secured at its ends to said yoke member, transvesre ribs on said plate in sealing engagement with said backing plates, resilient spring members carried by said plate engaging said backing plates to prevent said brake shoes from rattling, said resilient spring members each being provided with a pair of spring arms engaging apertures in said splash plate to removably secure said resilient members thereto.

References Cited by the Examiner

UNITED STATES PATENTS

| 2,918,990 | 12/1959 | Davis | 188—73 |
| 3,129,157 | 6/1964 | Hodkinson | 188—73 |
| 3,162,271 | 12/1964 | Hanson | 188—73 |

FOREIGN PATENTS

| 1,182,087 | 11/1964 | Germany. |
| 936,222 | 9/1936 | Great Britain. |
| 953,323 | 3/1964 | Great Britain. |

MILTON BUCHLER, *Primary Examiner.*

G. E. A. HALVOSA, *Assistant Examiner.*